United States Patent
Horng et al.

(10) Patent No.: US 7,265,514 B1
(45) Date of Patent: Sep. 4, 2007

(54) FREQUENCY-VARIABLE PULSE-WIDTH-MODULATION MOTOR DRIVE CIRCUIT CAPABLE OF OPERATING UNDER DIFFERENT PWM FREQUENCIES

(75) Inventors: Alex Horng, Kaohsiung (TW); Chung-Ken Cheng, Kaohsiung (TW); Pei-Wei Lo, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 11/386,673

(22) Filed: Mar. 23, 2006

(51) Int. Cl.
*H02P 6/08* (2006.01)
(52) U.S. Cl. .................. 318/723; 318/254; 318/721
(58) Field of Classification Search ............... 318/138, 318/254, 439, 720–724, 621, 632
See application file for complete search history.

(56) References Cited

U.S. PATENT DOCUMENTS

| | | | | |
|---|---|---|---|---|
| 3,899,725 | A * | 8/1975 | Plunkett | 318/802 |
| 4,143,311 | A * | 3/1979 | Lee | 318/611 |
| 6,181,092 | B1 * | 1/2001 | Turner | 318/254 |
| 6,690,135 | B2 * | 2/2004 | Mir et al. | 318/599 |
| 6,891,346 | B2 * | 5/2005 | Simmons et al. | 318/439 |
| 2001/0015633 | A1 | 8/2001 | Nishimura et al. | |
| 2002/0024313 | A1 | 2/2002 | Cho et al. | |
| 2002/0074969 | A1 | 6/2002 | Edelson | |
| 2002/0158600 | A1 | 10/2002 | Seima et al. | |

* cited by examiner

*Primary Examiner*—Bentsu Ro
(74) *Attorney, Agent, or Firm*—Birch, Stewart, Kolasch & Birch, LLP

(57) ABSTRACT

A frequency-variable PWM motor drive circuit includes a drive IC member, a Hall IC member, a PWM converter circuit and a compensation unit. The drive IC member electrically connects with the Hall IC member, the drive IC member further includes a pin electrically connected with the compensation unit and the PWM converter circuit. The PWM converter circuit has a PWM input pin to receive a PWM signal, and converts it into a voltage signal. The compensation unit connects between the pin of the drive IC member and the PWM converter circuit. In operation, the compensation unit can improve a waveform of the voltage signal supplied from the PWM converter circuit, and then output it to the pin of the drive IC member. Consequently, the drive IC member can be steadily operated at predetermined motor speeds under various frequencies of the PWM signals.

14 Claims, 6 Drawing Sheets

FREQUENCY-VARIABLE PULSE-WIDTH-MODULATION MOTOR DRIVE CIRCUIT CAPABLE OF OPERATING UNDER DIFFERENT PWM FREQUENCIES

BACKGROUND OF THE INVENTION

1. Field of the Invention

The present invention relates to a frequency-variable PWM (Pulse Width Modulation) motor drive circuit capable of operating under different PWM frequencies. More particularly, the present invention relates to the frequency-variable PWM modulation motor drive circuit having a compensation unit connected between a drive IC member and a PWM converter circuit such that the PWM converter circuit is capable of operating under different PWM frequencies.

2. Description of the Related Art

Referring to FIG. 1, a conventional PWM motor includes a PWM motor drive circuit 1 electrically connected with a motor coil 2 so as to carry out alternatively magnetizing (energizing) the motor coil 2. The alternatively magnetized motor coil 2 can drive a motor rotor (not shown) to turn with respect to a motor stator (not shown) of the PWM motor. Typically, the PWM motor drive circuit 1 includes a drive IC member 10, a Hall IC member 11 and a PWM converter circuit 12. The drive IC member 10 electrically connects with the Hall IC member 11 so as to permit drive IC member 10 to receive rotor-detecting signals (i.e. rotational detecting signals) generated from the Hall IC member 11. However, the drive IC member 10 is designed to have a pin $V_{TH}$ which electrically connects with the PWM converter circuit 12. Correspondingly, the PWM converter circuit 12 has a PWM input pin 121 serving to introduce a PWM signal from an exterior system-(not shown). The PWM converter circuit 12 further has a transistor 122. The PWM signal is converted into a voltage signal by the transistor 122 of the PWM converter circuit 12, and then sent it to the pin $V_{TH}$ of the drive IC member 10 for controlling or adjusting a period of alternative magnetization of the motor coil 2. Accordingly, operational statuses of the motor are possessed of multi-speed modes in heat-dissipating operation by means of the PWM signal.

Generally, the motor divides the operational statuses into a high-speed mode (including full speed), a low-speed mode (excluding full or zero speed) and a stopping mode (zero speed). The drive IC member 10 can determine the operational statuses of the motor according to the input PWM signal such that the motor can be adjusted and changed in speeds to fulfill various system needs. For example, when a voltage of the pin $V_{TH}$ of the drive IC member 10 is higher than 3.6 volts, the drive IC member 10 controls the motor to operate at the stopping mode as well as zero rpm. Conversely, when the voltage of the pin $V_{TH}$ of the drive IC member 10 is lower than 2.0 volts, the drive IC member 10 controls the motor to operate at the high-speed mode as well as 6,000 rpm. If the voltage of the pin $V_{TH}$ of the drive IC member 10 is in the range of 2.0 volts to 3.6 volts, the drive IC member 10 controls the motor to operate at the low-speed mode as well as greater than zero rpm but lesser than 6,000 rpm.

Referring again to FIG. 1, the PWM motor drive circuit 1 is designed to have a capacitor 3 parallel-connected between the drive IC member 10 and the PWM converter circuit 12. Meanwhile, the capacitor 3 is designed to have a ground connection in place. In operation, the capacitor 3 is adapted to commutate a saw tooth wave input from the PWM converter circuit 12. However, the capacitor 3 of the PWM motor drive circuit 1 is so configured to stabilize the voltage of the pin $V_{TH}$ of the drive IC member 10. When the motor is actuated, the voltage of the pin $V_{TH}$ of the drive IC member 10 can determine and adjust the speed of the motor.

Referring to FIGS. 2A and 2B, the drive IC member 10 can control the motor to operate in the high-speed mode or the low-speed mode. In normal operation, the speed of the motor is operating at 2,000 rpm as well as low-speed mode when the voltage of the pin $V_{TH}$ of the drive IC member 10 is maintained at 3.0 volts (i.e. lesser than 3.6 volts but greater than 2.0 volts). But, in abnormal (high temperature) operation, the speed of the motor is operating at high-speed mode when the voltage of the pin $V_{TH}$ of the drive IC member 10 is dropped to zero volts (i.e. lesser than 2.0 volts). Still referring to FIGS. 2A and 2B, due to a ground connection, the voltage across the capacitor 3 is generally zero volts, as best shown in FIG. 2A, and the capacitor 3 can be charged by a voltage from a power supply when the motor is started. Inevitably, the voltage of the pin $V_{TH}$ of the drive IC member 10 is maintained at substantially zero volts. In this way, the drive IC member 10 can invariably control the motor to operate in the high-speed mode as long as the motor is started; namely, the speed of the motor is rapidly and shortly jumped to 6,000 rpm (i.e. full speed) from zero rpm, as best shown in FIG. 2B.

Referring back to FIGS. 1 and 2B, once started, the motor must inevitably enter the high-speed mode that must rapidly and shortly increase the speed of the motor. However, there is no greater amount of operational heat for dissipation. This results in the motor unnecessarily operating at full speed (i.e. top speed) that generates an increased amount of air noise and vibration. Furthermore, the motor occurs an increased amount of abrasion among motor components that may shorten the longevity of the motor.

Referring again to FIGS. 2A and 2B, the voltage across the capacitor 3 can reach 3.0 volts in the event after charging for a predetermined time. In this way, the voltage of the pin $V_{TH}$ of the drive IC member 10 is greater than 2.0 volts but lesser than 3.6 volts so that the drive IC member 10 terminates the motor to operate in the high-speed mode. Accordingly, the speed of the motor is dropped to a predetermined speed or a lower speed of 2,000 rpm.

However, ambient heat generated from a heat source is lower than a high temperature when the motor is started. Therefore, it is undesirable to permit the drive IC member 10 to increase the speed of the motor reaching 6,000 rpm in the high-speed mode that is unsuitable for the need of normal usage or an improper usage of the motor due to a waste of power consumption. Hence, there is a need for improving the motor to prevent entering the high-speed mode while starting.

In order to solve the motor to be unexpectedly operated at the high-speed mode while starting, an approach to this problem is disclosed in applicant's own U.S. patent application Ser. No. 11/274,417, the entire disclosure of which is incorporated herein by reference. In this approach, a capacitor is parallel connected between a pin $V_{TH}$ of the PWM drive IC member and PWM converter circuit, and the capacitor has an end further connecting with a power source. Accordingly, the voltage of the pin $V_{TH}$ of the PWM drive IC member 10 cannot drop to zero voltage in such a way as to prevent the motor from unexpectedly entering a high-speed mode while starting the motor.

Turning now to FIG. 3A, a pair of waveform diagrams show a PWM input terminal and a collector of a transistor Q1 of the conventional PWM motor drive circuit in FIG. 1 when PWM signals with 50%-duty cycle and frequency of 100 Hz are applied. With reference to FIGS. 1 and 3A, the PWM signals with 50% duty cycle and frequency of 100 Hz are supplied to the PWM input pin 121 of the PWM converter circuit 12. A waveform of the PWM signals of the PWM input pin 121 is identically corresponding to that of the collector of the transistor 122, but phases of them are completely complemented, as is demonstrated in observed experimental results in the study. That is to say, the motor speed can be almost constant as long as the frequencies of the PWM signals supplied to the motor are lower than 100 Hz.

Turning now to FIG. 3B, a pair of waveform diagrams show the PWM input terminal and the collector of the transistor Q1 of the conventional PWM motor drive circuit in FIG. 1 when different PWM signals with 50% duty cycle and frequency of 100 KHz are selectively applied. In comparison with a waveform of the PWM signals input to the PWM input pin 121, a waveform of the collector of the transistor 122 is distorted greatly and the ratio of a peak to a wavelength of this waveform is specifically reduced. This results in an incorrect motor speed relative to a predetermined motor speed due to duty cycle less than 50%. The PWM signals possess the same of 50% duty cycle but the frequencies has changed to 100 KHz. Similarly, if other higher frequencies of the PWM signals are applied to the PWM input pin 121 of the PWM converter circuit 12, the motor speeds can be shifted due to a reduction of duty cycle, and cannot be consistent with predetermined motor speeds in relation to selected duty cycles. Frankly, the conventional PWM converter circuit 12 is only suitable for applying in the frequencies of the PWM signals lower than 100 Hz, and is unsuitable for applying in the frequencies higher than 100 Hz, other higher frequencies, or the frequency of 100 KHz.

As is described in greater detail below, the present invention intends to provide a frequency-variable PWM motor drive circuit capable of operating under different PWM frequencies, wherein a compensation unit connects between a drive IC member and a PWM converter circuit. The compensation unit can compensate distortions of a waveform supplied from the PWM converter circuit due to changes in frequencies of PWM signals. Accordingly, the frequency-variable PWM motor drive circuit can be applied in various frequencies of the PWM signals in such a way as to mitigate and overcome the above problem.

SUMMARY OF THE INVENTION

The primary objective of this invention is to provide a frequency-variable PWM motor drive circuit capable of operating under different PWM frequencies, wherein a compensation unit connects between a drive IC member and a PWM converter circuit. The compensation unit can improve a waveform supplied from the PWM converter circuit so that a distortion of the ratio of a peak to a wavelength of the waveform is attenuated. Accordingly, the PWM motor drive circuit is so configured to be suitable for applying in various frequencies of PWM signals.

The secondary objective of this invention is to provide the frequency-variable PWM motor drive circuit capable of operating under different PWM frequencies, wherein a compensation unit connects between a drive IC member and a PWM converter circuit. The compensation unit can prevent distortions of the waveform from directly supplying to the drive IC member. Accordingly, the PWM motor drive circuit is so configured to steady motor speeds while applying in various frequencies of PWM signals.

The frequency-variable PWM motor drive circuit in accordance with an aspect of the present invention includes a drive IC member, a Hall IC member, a PWM converter circuit and a compensation unit. The drive IC member electrically connects with the Hall IC member, the drive IC member further includes a pin electrically connected with the compensation unit and the PWM converter circuit. The PWM converter circuit has a PWM input pin to receive a PWM signal, and converts it into a voltage signal. The compensation unit connects between the pin of the drive IC member and the PWM converter circuit. In operation, the compensation unit can improve a waveform of the voltage signal supplied from the PWM converter circuit, and then output it to the pin of the drive IC member. Consequently, the drive IC member can be steadily operated at predetermined motor speeds under various frequencies of the PWM signals.

In a separate aspect of the present invention, the compensation unit includes a transistor having a collector to form a voltage-signal output terminal.

In a further separate aspect of the present invention, the compensation unit further includes a resistor through which a base of the transistor connects with a power source.

In a yet further separate aspect of the present invention, the compensation unit further includes a capacitor which is parallel-connected between the power source and the transistor.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
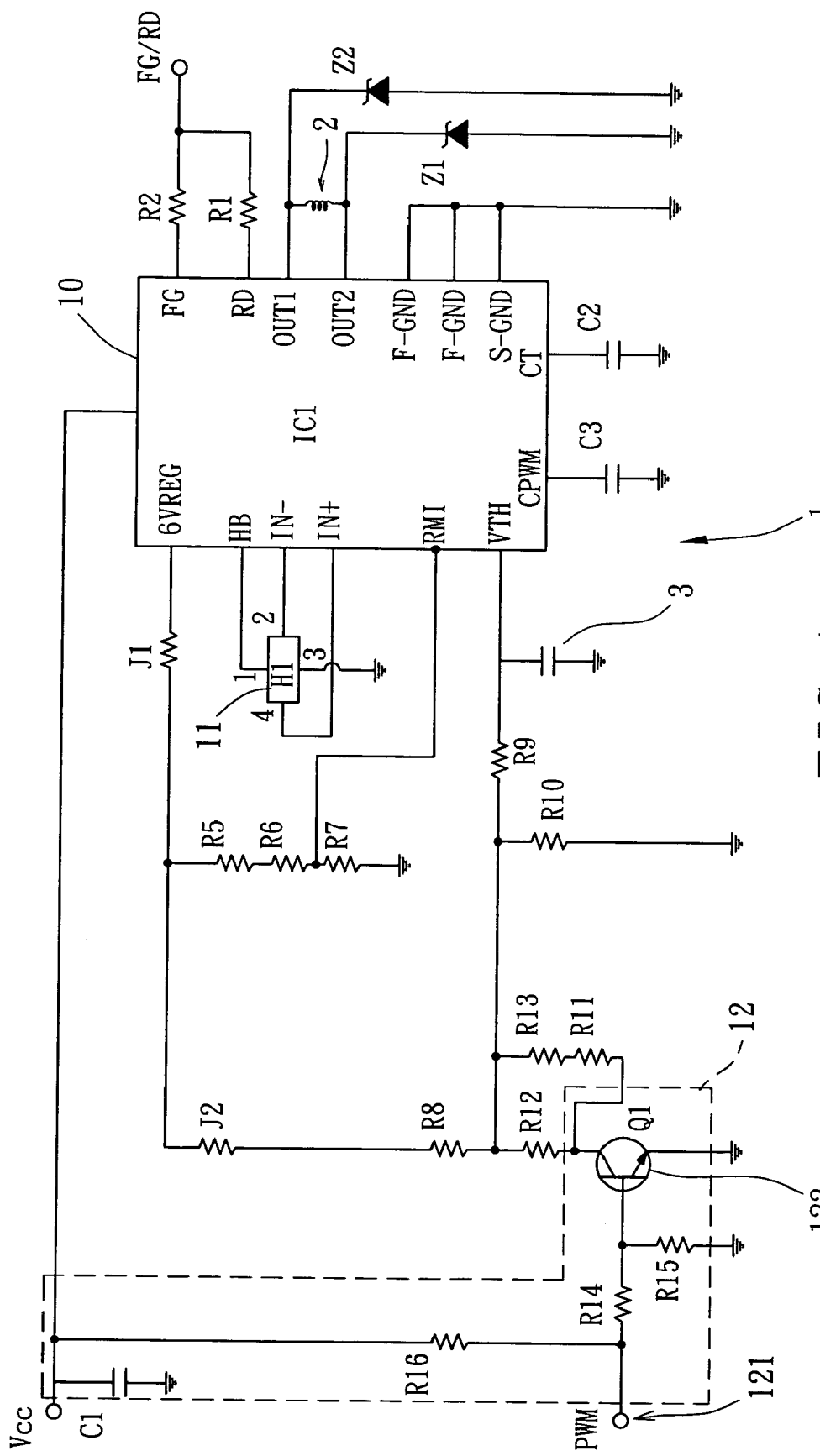
FIG. 1 is a schematic circuitry diagram of a conventional PWM motor drive circuit in accordance with the prior art.
Figure 2A:
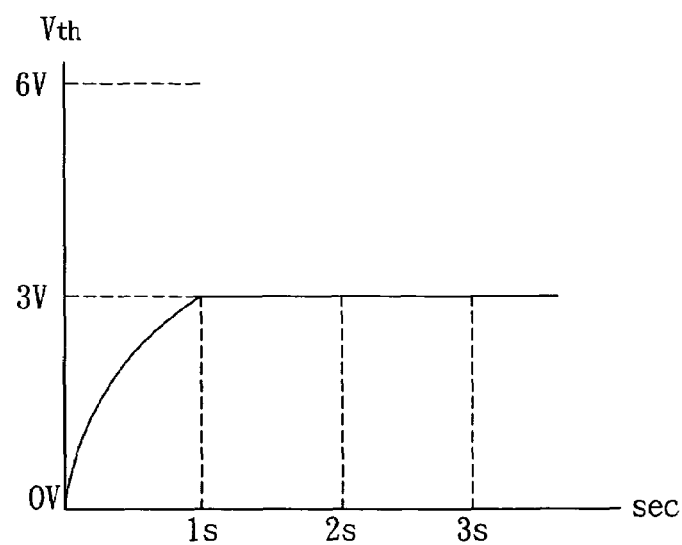
FIG. 2A is a timing diagram relating to the voltage at a selected pin of a drive IC member of the conventional PWM motor drive circuit in FIG. 1 in accordance with the prior art.
Figure 2B:
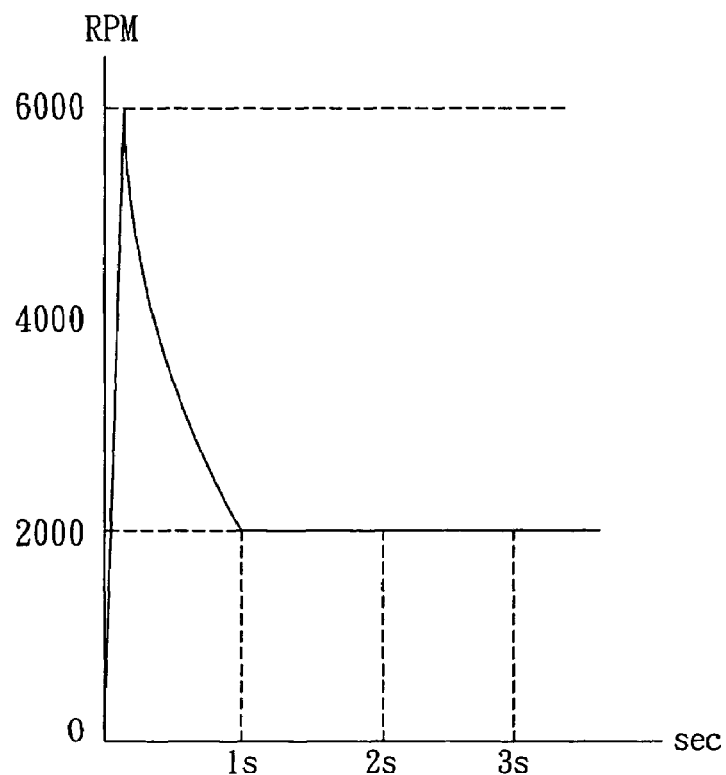
FIG. 2B is a timing diagram relating to the speed of the conventional PWM motor in accordance with the prior art.
Figure 4:
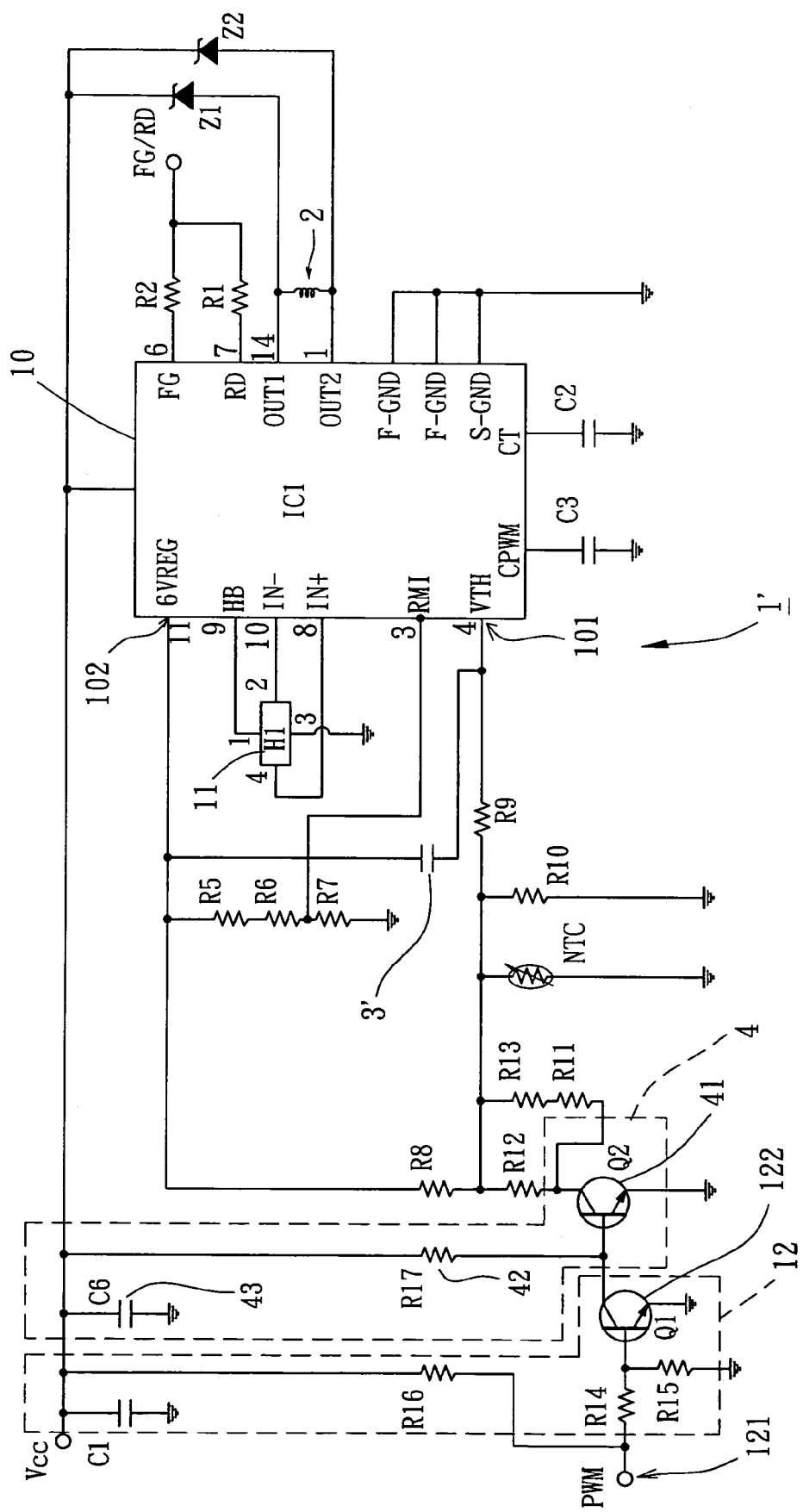
FIG. 4 is a schematic circuitry diagram of a frequency-variable PWM motor drive circuit in accordance with a preferred embodiment of the present invention.

Turning now to FIG. 4, a schematic circuitry diagram illustrating a frequency-variable PWM motor drive circuit in accordance with a preferred embodiment of the present invention is provided. It should be understood that reference numerals of the PWM motor drive circuit of the preferred embodiment of the present invention have applied the identical numerals of the conventional PWM motor drive circuit, as shown in FIG. 1.

Still referring to FIG. 4, the frequency-variable PWM motor drive circuit 1' electrically connects with a motor coil 2 so as to carry out alternatively magnetizing the motor coil 2. In a preferred embodiment, the motor coil 2 can be selected from a group consisting of a single-phase coil, a double-phase coil and a three-phase coil. Typically, the frequency-variable PWM motor drive circuit 1' includes a drive IC member 10, a Hall IC member 11, a PWM converter circuit 12, at least one capacitor 3' and a compensation unit 4. In operation, the frequency-variable PWM motor drive circuit 1' is adapted to control the motor coil 2 so that the motor coil 2 can generate an alternatively magnetic field.

Still referring to FIG. 4, the drive IC member 10 electrically connects with the Hall IC member 11, and further electrically connects with the PWM converter circuit 12. The drive IC member 10 includes a first pin (identified as $V_{TH}$) 101 and a second pin 102 (identified as 6VREG). The first pin $V_{Th}$ 101 is arranged to electrically connect with the PWM converter circuit 12 via the compensation unit 4 for introducing PWM signals while the second pin 102 is arranged to electrically connect with the PWM converter circuit 12 via the compensation unit 4 for supplying a predetermined voltage to the compensation unit 4 and the capacitor 3'. In a preferred embodiment, the second pin 102 of the drive IC member 10 supplies 6.0 volts to the compensation unit 4 and the capacitor 3'.

Still referring to FIG. 4, the Hall IC member 11 is adapted to detect a signal of a motor rotor and to send it to the drive IC member 10. Accordingly, the drive IC member 10 can determine switching on or off the motor coil 2 such that the alternatively magnetic field of the motor coil 2 can drive the motor rotor to turn.

The PWM converter circuit 12 has a PWM input terminal 121 connected with a PWM source to receive PWM signals, and a transistor (identified as "$Q_1$") 122 having a base connected with the PWM input terminal 121 by referring particularly to the left side of FIG. 4. In operation, the PWM converter circuit 12 is adapted to convert the PWM signals into voltage signals and to send them to the first pin 101 of the drive IC member 10 such that the drive IC member 10 can determine a cycle for switching the alternatively magnetic field of the motor coil 2. Consequently, the speed of the PWM motor is controlled.

The capacitor 3' connects in parallel between the first pin 101 of the drive IC member 10 and the PWM converter circuit 12 by referring particularly to the middle portion of FIG. 4. In an alternative embodiment, the capacitor 3' can be constructed from a plurality of capacitor units which are connected in parallel or series each other. Meanwhile, the capacitor 3' connects between the first pin 101 and the second pin 102 of the drive IC member 10. In an alternative embodiment, the capacitor 3' can connect with a power source. When the PWM motor is stopped, the voltage of the capacitor 3' can be maintained at 3.0 volts due to the voltage of the second pin 102 of the drive IC member 10.

Still referring to FIG. 4, once the PWM motor is started, the voltage of the first pin 101 of the drive IC member 10 can be gradually dropped from 6.0 volts to 3.0 volts. Correspondingly, the speed of the PWM motor can be started from zero (i.e. stopped status); speeded up within the buffer period determined by the frequency-variable PWM motor drive circuit 1'; and maintained at 2,000 rpm for example or a predetermined speed in the event.

Referring back to the middle portion of FIG. 4, the capacitance of the capacitor 3' can be adjusted according to the design choice so that the buffer period for the frequency-variable PWM motor drive circuit 1' can be adjusted. Advantageously, the speed of the PWM motor must be paced within the buffer period determined by the frequency-variable PWM motor drive circuit 1' to reach a predetermined speed. Consequently, improper speeding of the PWM motor can be eliminated while starting.

Referring back to the left side of FIG. 4, the compensation unit 4 electrically connects between the first pin 101 of the drive IC member 10 and the PWM converter circuit 12. In the illustrated embodiment, the compensation unit 4 includes a transistor (identified as "$Q_2$") 41, a resistor 42 and a capacitor 43. A base of the transistor 41 electrically connects with the collector of the transistor 122 of the PWM converter circuit 12, and further electrically connects with a power source (identified as "$V_{CC}$"). The capacitor 43 electrically connects in parallel between the transistor 41 and the power source. When the motor is rotated, the PWM signals are converted into the voltage signals by the PWM converter circuit 12, and are send them to the base of the transistor 41. In turning on or off operation, the transistor 41 is controlled by the input of the PWM input pin 121 of the PWM converter circuit 12, and is adjusted by the resistor 42 and the capacitor 43 to determine the waveform generated from the collector of the transistor 41. Namely, the voltage-signal output of the PWM converter circuit 12 can determine turning on or off the transistor 41 of the compensation unit 4. The waveform output from the collector of the transistor 41 and supplied to the first pin 101 of the drive IC member 10 can be substantially identical with that of the PWM input pin 121 of the PWM converter circuit 12, as will be discussed greater detail below.

Figure 5B:
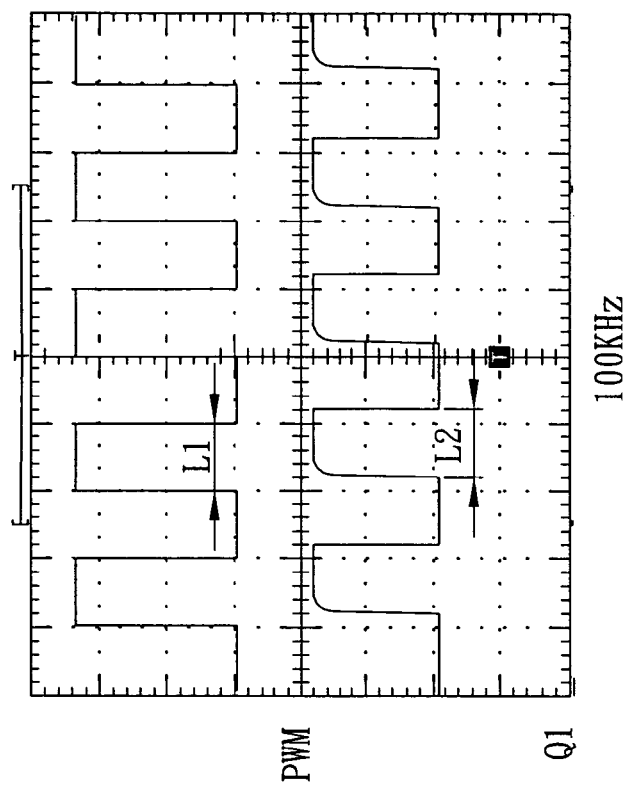
FIG. 5B is a pair of waveform diagrams showing a PWM input terminal and a collector of a transistor Q1 of a compensation unit in FIG. 4 in accordance with the preferred embodiment of the present invention when other PWM signals with 50% duty cycle and frequency of 100 KHz are selectively applied.
Figure 5A:
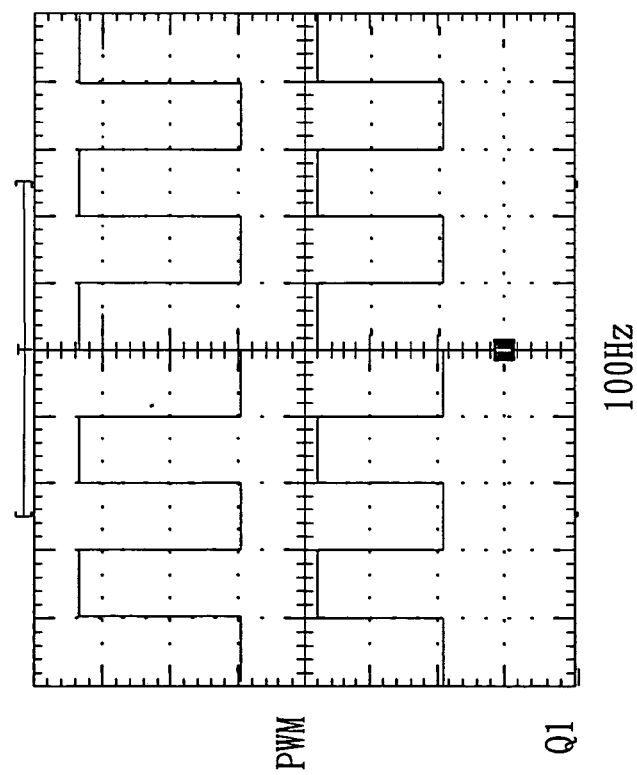
FIG. 5A is a pair of waveform diagrams showing a PWM input terminal and a collector of a transistor Q1 of a compensation unit in FIG. 4 in accordance with the preferred embodiment of the present invention when PWM signals with 50% duty cycle and frequency of 100 Hz are applied.

Turning now to FIG. 5A, a pair of waveform diagrams showing a PWM input terminal and a collector of a transistor Q1 of a compensation unit in FIG. 4 in accordance with the preferred embodiment of the present invention are illustrated when PWM frequency of 100 Hz is applied. When the PWM signals with 50% duty cycle and frequency of 100 Hz are input to the PWM input pin 121 of the PWM converter circuit 12, a voltage-signal waveform output from the collector of the transistor 41 is substantially identical with the waveform of the PWM input pin 121 of the PWM converter circuit 12, and phases of them are completely identical, as is demonstrated in observed experimental results in the study. The PWM signals possess 50% duty cycle and frequency of 100 Hz which can be compensated in the compensation unit 4, and the voltage-signal waveform subsequently output from the collector of the transistor 41 is substantially identical with the waveform of the PWM input pin 121 of the PWM converter circuit 12 in the event.

Figure 3B:
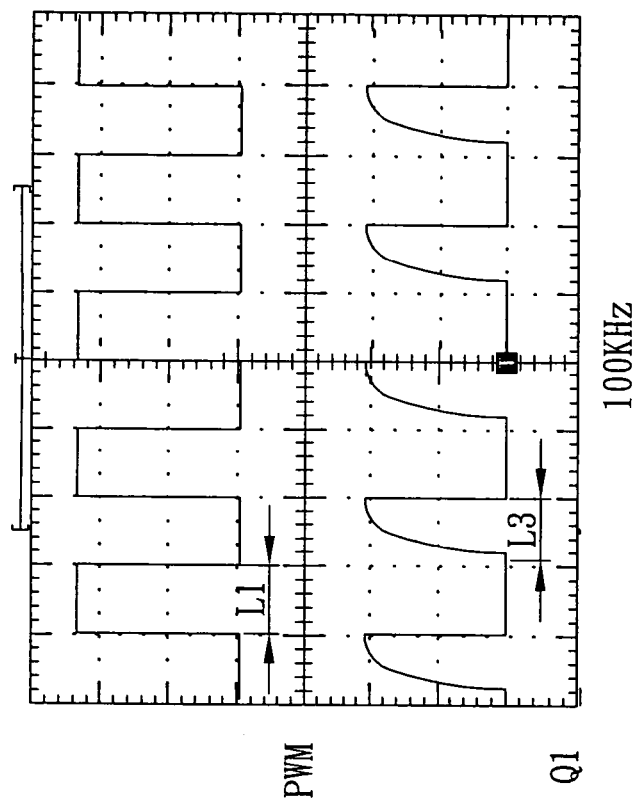
FIG. 3B is a pair of waveform diagrams showing a PWM input terminal and a collector of a transistor Q1 of the conventional PWM motor drive circuit in FIG. 1 in accordance with the prior art when other PWM signals with 50% duty cycle and frequency of 100 KHz are selectively applied.
Figure 3A:
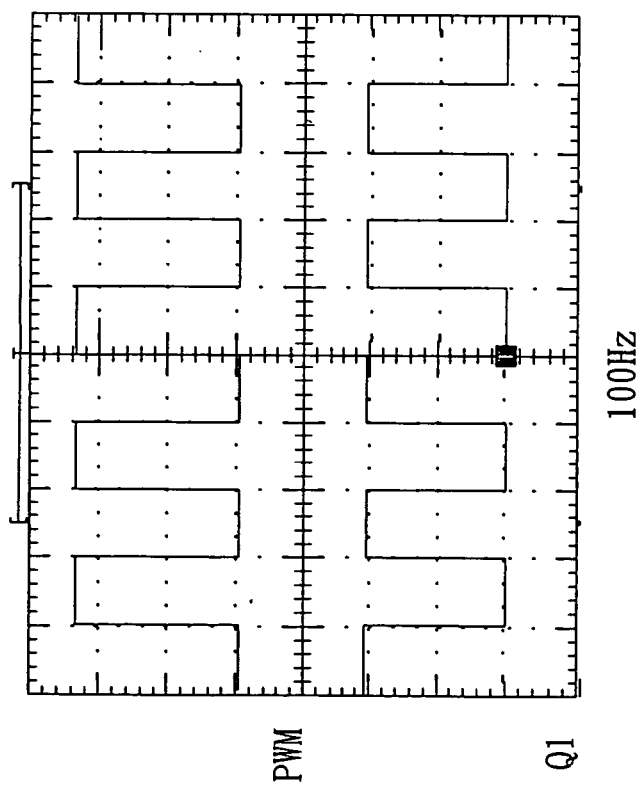
FIG. 3A is a pair of waveform diagrams showing a PWM input terminal and a collector of a transistor Q1 of the conventional PWM motor drive circuit in FIG. 1 in accordance with the prior art when PWM signals with 50% duty cycle and frequency of 100 Hz are applied.

Referring back to FIG. 3A, the waveform of the PWM signals of the PWM input pin 121 of the conventional PWM motor drive circuit 1 is identically corresponding to that of the collector of the transistor 122, when PWM frequencies of 100 Hz are applied. As explained above, the voltage-signal waveform output from the collector of the transistor 41 of the compensation unit 4 is substantially identical with the waveform of the PWM input pin 121 of the PWM converter circuit 12 by referring again to FIG. 5A, when PWM frequency of 100 Hz is applied. Apparently, both motor speeds of the conventional PWM motor drive circuit 1 and the frequency-variable PWM motor drive circuit 1' can be steadily operated in the predetermined speed.

Turning now to FIG. 5B, a pair of waveform diagrams showing a PWM input terminal and a collector of a transistor Q1 of a compensation unit in FIG. 4 in accordance with the preferred embodiment of the present invention are illustrated when PWM frequency of 100 KHz is applied. In the present invention, the voltage-signal waveform output from the collector of the transistor 41 of the compensation unit 4 is not completely identical with the waveform of the PWM input pin 121 of the PWM converter circuit 12, when PWM frequency of 100 KHz is applied. In comparison with receiving PWM frequency of 100 Hz, the compensation unit 4 received PWM frequency of 100 KHz may result in a great improvement of the voltage-signal waveform output from the collector of the transistor 41 such that the ratio of a peak to a wavelength of the voltage-signal waveform is approximately 50% duty cycle. Consequently, the motor speeds of the frequency-variable PWM motor drive circuit 1' can be close to the predetermined motor speeds.

Figure 6:
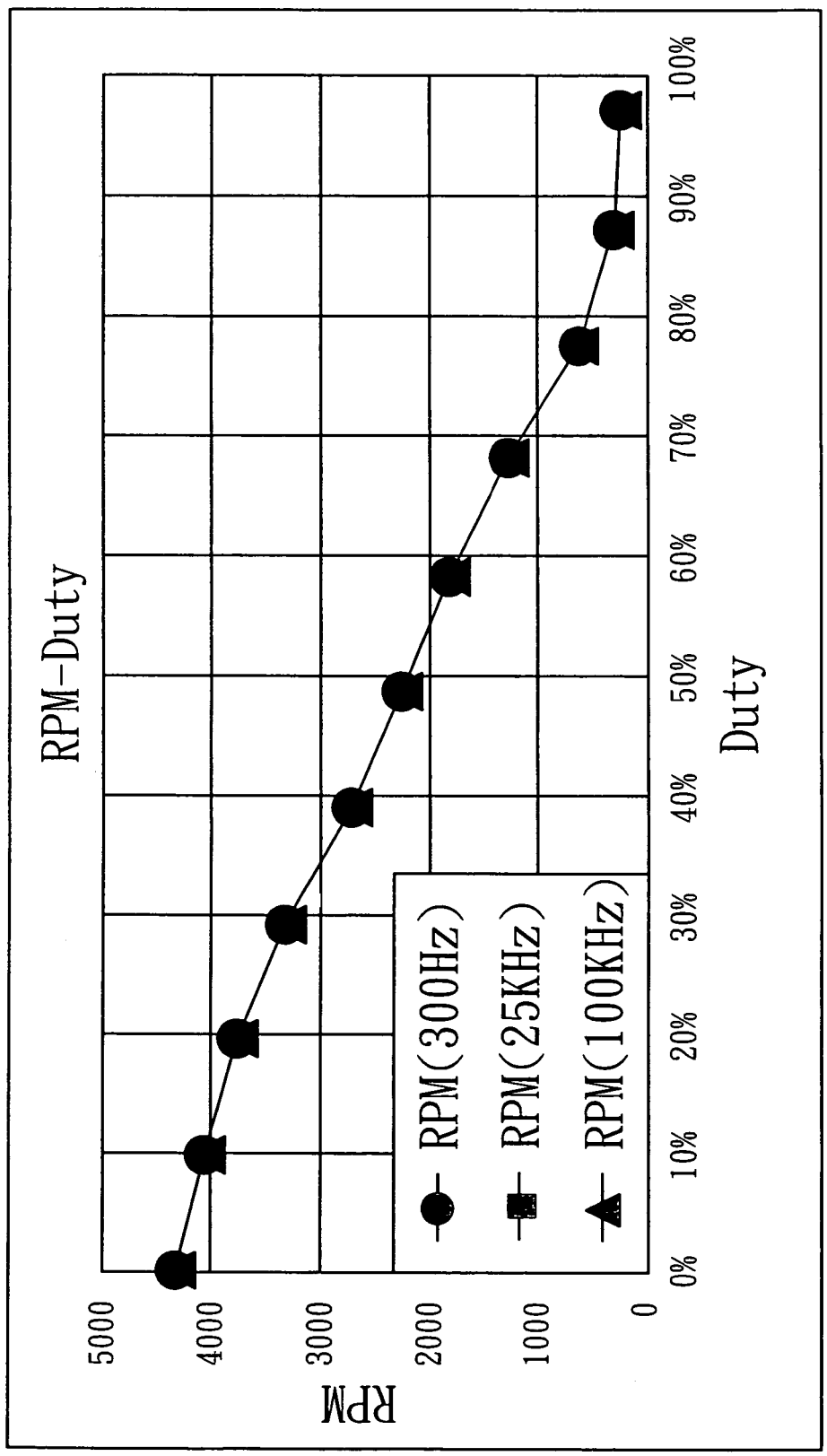
FIG. 6 is a chart illustrating motor speeds in relation to PWM signal with 0%, 10%, 20%, 30%, 40%, 50%, 60%, 70%, 80%, 90%, 100% duty cycles and frequencies of 300 Hz, 25 KHz and 100 KHz applied to the frequency-variable PWM motor drive circuit in accordance with a preferred embodiment of the present invention.

Turning now to FIG. 6, a chart illustrating motor speeds in relation to PWM signal with 0%, 10%, 20%, 30%, 40%, 50%, 60%, 70%, 80%, 90%, 100% duty cycles and frequencies of 300 Hz, 25 KHz and 100 KHz applied to the frequency-variable PWM motor drive circuit in accordance with a preferred embodiment of the present invention is shown. In table 1, symbols of closed circles (●) represent PWM frequency of 300 Hz; symbols of closed squares (■) represent PWM frequency of 25 KHz; and symbols of closed triangles (▲) represent PWM frequency of 100 KHz. This is a demonstration of the fact that there are slight variations in motor speeds controlled in PWM frequencies of 300 Hz, 25 KHz and 100 KHz at selected duty cycles of 0%, 10%, 20%, 30%, 40%, 50%, 60%, 70%, 80%, 90% and 100%, as shown in table 1. Table 1 provides distributions of the motor speeds in relation to the PWM signals at selected duty cycles of 0%, 10%, 20%, 30%, 40%, 50%, 60%, 70%, 80%, 90% and 100%. In the test, no unwanted variation is measured if PWM frequency is greater than 100 Hz.

TABLE 1 motor speeds of the frequency-variable PWM motor drive circuit in accordance with the preferred embodiment of the present invention in relation to PWM frequencies of 300 Hz, 25 KHz and 100 KHz

| Duty | 300 Hz | 25 KHz | 100 KHz |
|---|---|---|---|
| 0% | 4,220 rpm | 4,220 rpm | 4,220 rpm |
| 10% | 3,960 rpm | 3,960 rpm | 3,985 rpm |
| 20% | 3,700 rpm | 3,670 rpm | 3,705 rpm |
| 30% | 3,280 rpm | 3,260 rpm | 3,280 rpm |
| 40% | 2,710 rpm | 2,690 rpm | 2,700 rpm |
| 50% | 2,260 rpm | 2,265 rpm | 2,270 rpm |
| 60% | 1,830 rpm | 1,835 rpm | 1,840 rpm |
| 70% | 1,300 rpm | 1,295 rpm | 1,300 rpm |
| 80% | 665 rpm | 675 rpm | 680 rpm |
| 90% | 365 rpm | 370 rpm | 365 rpm |
| 100% | 325 rpm | 330 rpm | 330 rpm |

Referring back to FIGS. 3B and 5B, in the conventional PWM motor drive circuit 1 the waveform of the collector of the transistor 122 is distorted greatly in comparison with that of the PWM signals input to the PWM input pin 121 of the PWM converter circuit 12. Conversely, in the PWM motor drive circuit 1' of the present invention the compensation unit 4 received PWM frequency of 100 KHz may result in a great improvement of the voltage-signal waveform output from the collector of the transistor 41 even though there exists a slight distortion of the waveform. With reference to the lower portions of FIGS. 5B and 3B, in the PWM motor drive circuit 1' of the present invention the collector of the transistor 41 has a peak width (identified as "L2") substantially identical with that (identified as "L1") of the PWM input pin 121. Disadvantageously, in the conventional PWM motor drive circuit 1 the collector of the transistor 122 has a peak width (identified as "L3") substantially identical with that (identified as "L1") of the PWM input pin 121

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A frequency-variable PWM motor drive circuit, comprising:
    a drive IC member electrically connected with a motor coil, the drive IC member being capable of controlling a speed of a motor;
    a PWM converter circuit electrically connected with the drive IC member, the PWM converter circuit including a PWM input pin for inputting a PWM signal;
    a compensation unit connected between the drive IC member and the PWM converter circuit, said compensation unit further connected with a power source; and
    a capacitor connected between a first pin and a second pin of the drive IC member, a voltage of said first pin of the drive IC member being dropped to a predetermined voltage when the motor starts;
    wherein the compensation unit compensates a voltage-signal output from the PWM converter circuit, and sends it to the drive IC member.

2. The frequency-variable PWM motor drive circuit as defined in claim 1, wherein said compensation unit includes a transistor having a collector to form a voltage-signal output terminal.

3. The frequency-variable PWM motor drive circuit as defined in claim 2, wherein said compensation unit further includes a resistor through which a base of the transistor connects with a power source.

4. The frequency-variable PWM motor drive circuit as defined in claim 3, wherein said compensation unit further includes a capacitor which is parallel-connected between the power source and the transistor.

5. The frequency-variable PWM motor drive circuit as defined in claim 1, wherein various frequencies of the PWM signal are input to the PWM input pin of the PWM converter circuit, and are applied to the PWM motor drive circuit.

6. The PWM motor as defined in claim 1, wherein said first pin of the drive IC member connects with the PWM converter circuit via the compensation unit.

7. The PWM motor as defined in claim 1, wherein said second pin of the drive IC member connects with the PWM converter circuit via the compensation unit, and supplies a voltage to the PWM converter circuit via the compensation unit.

8. A frequency-variable PWM motor, comprising:
- a motor coil adapted to generate a magnetic field for driving a motor rotor;
- a frequency-variable PWM motor drive circuit including a drive IC member electrically connected to the motor coil, the PWM motor drive circuit being capable of controlling a speed of the PWM motor;
- a PWM converter circuit electrically connected with the drive IC member, the PWM converter circuit including a PWM input pin for inputting a PWM signal;
- a compensation unit connected in parallel between the drive IC member and the PWM converter circuit, said compensation unit further connected with a power source; and
- a capacitor connected between a first pin and a second pin of the drive IC member, a voltage of said first pin of the drive IC member being dropped to a predetermined volt when the motor starts;
- wherein the compensation unit compensates a voltage-signal output from the PWM converter circuit, and sends it to the drive IC member.

9. The PWM motor as defined in claim 8, wherein said compensation unit includes a transistor having a collector to form a voltage-signal output terminal.

10. The PWM motor as defined in claim 9, wherein said compensation unit further includes a resistor through which a base of the transistor connects with a power source.

11. The PWM motor as defined in claim 10, wherein said compensation unit further includes a capacitor which is parallel-connected between the power source and the transistor.

12. The PWM motor as defined in claim 8, wherein various frequencies of the PWM signal are input to the PWM input pin of the PWM converter circuit, and are applied to the PWM motor drive circuit.

13. The PWM motor as defined in claim 8, wherein said first pin of the drive IC member connects with the PWM converter circuit via the compensation unit.

14. The PWM motor as defined in claim 8, wherein said second pin of the drive IC member connects with the PWM converter circuit via the compensation unit, and supplies a voltage to the PWM converter circuit via the compensation unit.

* * * * *